Nov. 18, 1969         J. POCCARD         3,478,802
SAFETY DEVICE FOR AN UNLOSABLE SHAFT
Filed May 16, 1968

Inventor:
Jacques Poccard
By
Kam U. Fiocks
Attorney

United States Patent Office 3,478,802
Patented Nov. 18, 1969

3,478,802
SAFETY DEVICE FOR AN UNLOSABLE SHAFT
Jacques Poccard, La Varenne, France, assignor to Nord-Aviation Societe Nationale de Constructions Aeronautiques, Paris, France, a joint-stock company of France
Filed May 16, 1968, Ser. No. 729,786
Claims priority, application France, May 17, 1967, 106,716
Int. Cl. F16b 39/00, 43/00
U.S. Cl. 151—41.75
1 Claim

ABSTRACT OF THE DISCLOSURE

Safety assembly in two parts of the type comprising an unlosable shaft provided with a conventional immobilizing device, the said safety assembly comprising a pawl with a side finger elastically held by a spring and by a pin, the said pawl being axially disposed in a housing made concentrically to said shaft and in a groove made radially in the flattened head of the shaft.

---

The present invention relates to a safety device for an unlosable shaft, and more particularly a high safety assembly employed in the controls of aircraft steering devices for example.

Generally speaking any unlosable shaft comprises, independently of its main immobilizing system, an accompanying safety device adapted to maintain said shaft in position in the event of the main immobilizing system failing.

This safety device is usually constituted by a mechanism having radial action acting on the rear face of the assembly, that is to say the face opposite to the supporting face of the head of the unlosable shaft. However and for reasons which will be explained hereafter, one has been able to observe that shafts of the usual type did not respond up to the present to all the imperatives required in practice.

Thus:

The conventional unlosable shaft presents a reduced cross section, thus weakened, due to the presence of an axial longitudinal orifice extending through it entirely in order to house the notching mechanism. Furthermore, this weakening is further accentuated in the area where this notching device emerges when it bears against the rear face of the assembly.

The positioning of such shafts necessitates the momentary retracting of the notching device at the time of assembling which, in the case of forgetfulness, creates a risk of damage to the bore.

Their production is rather complicated thus costly especially if one considers the fact that the immobilizing nut is special when it cooperates, by its own braking, with the notching device.

Consequently, the present invention provides a safety device for an unlosable shaft which does not possess the above mentioned disadvantages and which more satisfactorily answers the needs.

According to the device of the invention:

The locking of the shaft takes place on the front face of the assembly, that is to say the head supporting face.

A grooved boss disposed on the front face of the assembly receives the latch of the unlosable shaft and acts as an alarm signal in the case of an inverted mounting of said shaft.

The geometry of the boss is such that immobilization during rotation of the shaft is ensured.

Other characteristics and advantages will become apparent in the course of the following description, when read in conjunction with the accompanying drawings and showing by way of example in a purely indicative and by no means limitative manner, an embodiment of the invention.

Figure 1:
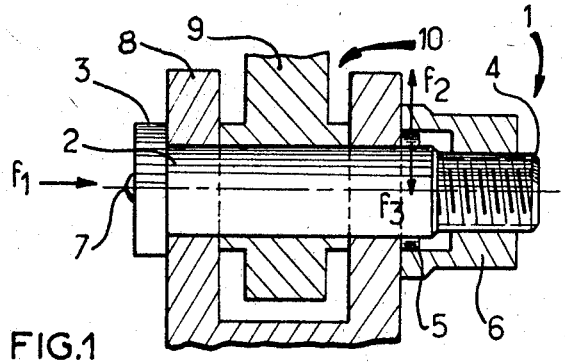
FIG. 1 is a view in partial axial section of a conventional unlosable shaft.

A conventional unlosable shaft such as the one which is shown in FIG. 1 and indicated by 1 as a whole, is generally constituted by a main shaft 2 which comprises a supporting head 3 and a threaded part 4, a notching mechanism having one or several projecting parts or latches 5, as well as a pressure device (not shown) for retracting the part or parts 5, and a braked nut 6.

Thus and in known manner, when one presses in the direction of the arrow F1 on a projection 7, one produces a retracting in the direction of the arrow F3 of the latches 5, which then permits of inserting the shaft 2 in the bores of the fork 8 and the hinge 9 constituting the assembly 10. Thereafter, when the shaft is suitably in place an elastic recall action in the direction of the arrow F2 causes the latch 5 to bear against the rear face of the fork 8 thus producing the locking effect sought after; the final immobilization is however always ensured by the nut 6 which may in certain cases further cooperate, due to suitable grooves, with the latch 5 by auto-braking.

It will be observed that such an unlosable shaft is relatively complicated and that moreover the orifices for the passage of the notching mechanism 7 and of the latch or latches 5 substantially reduce the working section in the cutting zones of the hinges 8, 9 as well as in the section situated in the bearing zone of the nut 6.

Figure 2:
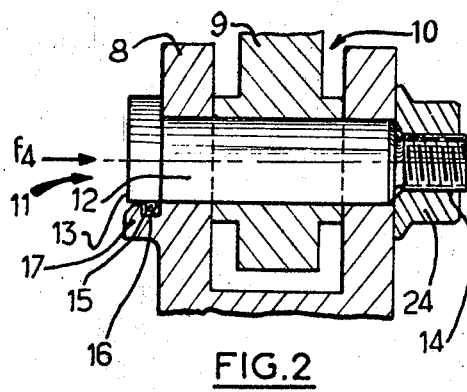
FIG. 2 is a view in partial axial section of an unlosable shaft according to the invention.

The unlosable shaft according to the present invention and which is indicated by 11 as a whole and shown in FIG. 2, is essentially constituted by a main shaft 12, which comprises a truncated supporting head 13 and a threaded part 14. A locking mechanism comprising one or several retractable projecting parts 15 engages in the groove 16 behind one or several bosses 17 integral with the element 8.

Thus, in such a shaft, one sees, as is shown in FIG. 2, that, to the extent that the part 15 is subjected to a suitable radial elastic recall action, the clicking of the latter in the corresponding groove 16 will take place merely under the effect of an axial outer action in the direction of the arrow F4 on the shaft 12; this being facilitated by the presence of a chamfer on the parts 15 and 17. Similarly the unlocking of this same part is produced when, by any adequate manual means, one brings about the retracting of the projection 15 inside the shaft 12 so as to allow it to clear the boss 17. In addition, the shaft 12 is immobilized against any rotation by the embedding of the flat part or parts of the head 13 in the boss or bosses 17.

Figure 6:
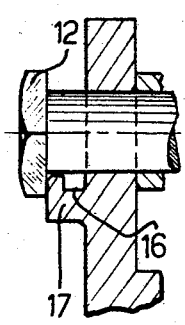
FIG. 5 and 6 are detail views.
Figure 5:
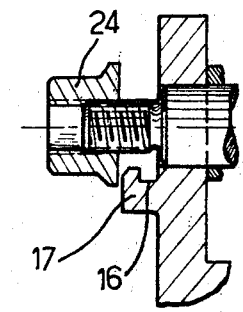

In this way one may see that the disadvantages of the prior art have been eliminated and that consequently such a shaft is lighter, of more reduced bulk and of simpler construction. Similarly, the presence of bosses acts favourably, as is shown in FIGS. 5 and 6, either to prevent any mountings wrong way up or to eliminate any risks of mounting inadapted shafts.

Figure 3:
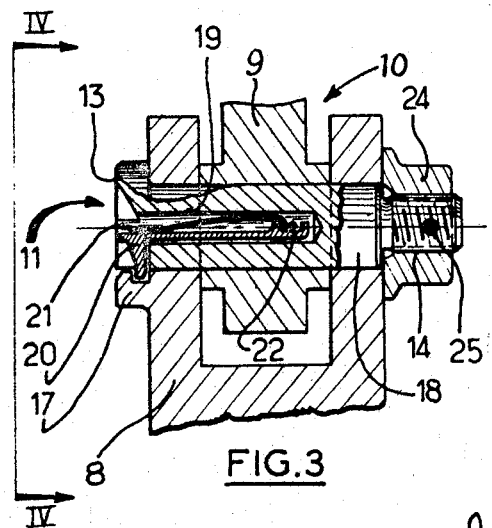
FIG. 3 is a view in axial section of the unlosable shaft of FIG. 2.
Figure 4:
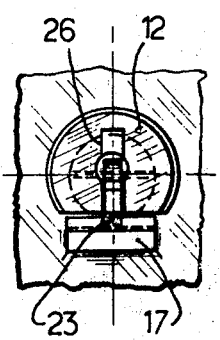
FIG. 4 is an end view along line IV—IV of FIG. 3.

According to the preferred embodiment of the invention which is shown in FIGS. 3 and 4, the unlosable shaft indicated by 11 as a whole essentially comprises a shaft 18 which comprises a flattened head 13, and a threaded part 14. This shaft has a central hole 19 and a groove 26 to house a latch, latch itself comprising a pawl 20, held by a spring 21 and fixed by a pin 22. Similarly, a boss 17 integral with the part 8 of the assembly 10 comprises a groove 23 in which is embedded the lateral end of the pawl 20. The shape and the position of said boss are such that the flat part of the head of the shaft then prevents any accidental rotation of the latter.

One sees in the drawings of FIGS. 3 and 4 that the action of the pawl 20 facilitates the positioning of the shaft when, after having pushed the latter, the chamfered notch 15 falls into the groove 23 of the boss. Similarly, the extraction of the shaft is as easy and it is realized, after disengagement of the pawl 20 by means of a tool such as a screwdriver for example, by drawing said shaft out of the assembly.

Moreover, a conventional nut 24 braked for example by a pin 25 ensures the final immobilization of the shaft 18.

As a complement of the advantages possessed by the unlosable shaft according to the invention, one may further observe that the unlocking action does not take place in a direction contrary to the one necessary for the extraction of the shaft as is the case with conventional shafts. Similarly, the nut may be of any type and screwed directly on the shaft without the assistance of any complementary immobilizing tool since the boss or bosses 17 immobilize the shaft against any rotation.

It is obvious that the present description has been described above by way of example only in an explanatory but by no means limitative manner and that any changes may be made therein, in conformity with its spirit, without coming out of its scope.

Thus, the locking mechanism may be of any type so long as it permits notching on the front face of the assembly and that the method of final immobilization may be chosen amongst devices in use.

I claim:
1. A safety assembly of two parts comprising:
   an unlosable shaft provided with a head having a flattened side surface at one of its ends, and with a conventional immobilizing means, engaging its other end;
   an axial bore made concentrically in said shaft opening toward said head and provided with a groove made radially in the head of said shaft and opening thru said flattened side surface;
   a pawl with a side finger held by a pin in said axial bore;
   an elastic device disposed in said axial bore and urging said pawl into the projecting position;
   one of said two parts to be assembled being provided with a grooved boss adapted to receive the side finger of said pawl said boss having a surface to engage and lock the flattened surface of the head of said shaft relative to said part to be assembled.

References Cited
UNITED STATES PATENTS

| | | | |
|---|---|---|---|
| 168,303 | 9/1875 | Walter | 287—100 |
| 804,289 | 11/1905 | Willison | 85—5.5 |
| 1,363,477 | 12/1920 | Lowe | 287—100 |
| 2,209,007 | 7/1940 | Stevenson | 151—69 |
| 3,208,329 | 9/1965 | Copeland | 151—69 |

FOREIGN PATENTS

| | | |
|---|---|---|
| 446,355 | 4/1936 | Great Britain. |

EDWARD C. ALLEN, Primary Examiner

U.S. Cl. X.R.

151—44, 69